US011249455B2

United States Patent
Jalluri et al.

(10) Patent No.: US 11,249,455 B2
(45) Date of Patent: Feb. 15, 2022

(54) AUTOMATION SYSTEM AND WEAR DETECTION CONTROLLER

(71) Applicant: Ford Global Technologies, LLC, Dearborn, MI (US)

(72) Inventors: Chandra Sekhar Jalluri, Canton, MI (US); Youssef Ziada, Milford, MI (US); Annette Januszczak, Dearborn, MI (US); Himanshu Rajoria, Canton, MI (US); Timothy George Beyer, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 273 days.

(21) Appl. No.: 16/504,449

(22) Filed: Jul. 8, 2019

(65) Prior Publication Data

US 2021/0011455 A1   Jan. 14, 2021

(51) Int. Cl.
| | |
|---|---|
| *G05B 19/00* | (2006.01) |
| *G05B 19/4063* | (2006.01) |
| *G05B 13/02* | (2006.01) |
| *B25J 9/16* | (2006.01) |

(52) U.S. Cl.
CPC ........ *G05B 19/4063* (2013.01); *B25J 9/1674* (2013.01); *G05B 13/0265* (2013.01); *G05B 2219/31368* (2013.01); *G05B 2219/40293* (2013.01); *G05B 2219/50391* (2013.01)

(58) Field of Classification Search
None
See application file for complete search history.

(56) References Cited

U.S. PATENT DOCUMENTS

| | | | | |
|---|---|---|---|---|
| 5,274,546 A | * | 12/1993 | Kinoshita | G05B 19/4063 700/81 |
| 2013/0197854 A1 | * | 8/2013 | Liao | G05B 23/0224 702/130 |
| 2019/0286099 A1 | * | 9/2019 | Satou | G05B 19/4062 |

FOREIGN PATENT DOCUMENTS

| | | |
|---|---|---|
| CN | 102502412 | 6/2012 |
| CN | 102566503 | 7/2012 |
| CN | 202657850 | 1/2013 |
| CN | 102963828 | 3/2013 |

(Continued)

OTHER PUBLICATIONS

Zhou, Y. et al., A Multisensor Fusion Method for Tool Condition Monitoring in Milling, Sensors, vol. 18, 3866, pp. 1-18, 2018.

(Continued)

*Primary Examiner* — Paul B Yanchus, III
(74) *Attorney, Agent, or Firm* — Burris Law, PLLC

(57) ABSTRACT

A machine or autonomous system includes a diagnostic controller and is configured to perform a method for monitoring health of a machine. The method includes monitoring a set of first electrical signals indicative of control of a motor of the machine while the machine is operated in a first autonomous mode, determining that an abnormal operating condition has occurred in response to the set of first electrical signals meeting a first criteria, having the machine operate in a test mode in response to the determination that the abnormal operating condition has occurred, monitoring a set of second electrical signals indicative of control of the motor during the test mode, and determining a fault condition in response to the set of second electrical signals meeting a second criteria.

20 Claims, 6 Drawing Sheets

(56) References Cited

FOREIGN PATENT DOCUMENTS

CN   103539017   1/2014
CN   203682949   7/2014

OTHER PUBLICATIONS

Sun, et al., Using the Machine Vision Method to Develop an On-machine Insert Condition Monitoring System for Computer Numerical Control Turning Machine Tools, Materials, vol. 11, pp. 1-17, 2018.

* cited by examiner

AUTOMATION SYSTEM AND WEAR DETECTION CONTROLLER

FIELD

The present disclosure relates to an automation system and a method for determining system wear in the automation system.

BACKGROUND

The statements in this section merely provide background information related to the present disclosure and may not constitute prior art.

In high volume production settings, automated systems are typically used to manipulate or perform operations on workpieces. In one example, a workpiece handling system includes an end effector (e.g., a handling device), a base, a drive motor, a controller, a gantry and a plurality of wires that connect to the handling device. The gantry supports the wires for movement with the end effector relative to the base. The gantry generally furls and unfurls along a track of the base as the end effector moves. The drive motor is configured to cause the end effector to move relative to the base along one or more axes. In another example, a multi-axis robot can include a base, an end effector (e.g., a handling device), and an arm that supports the end effector relative to the base and is configured to position the end effector via movement about a plurality of axes.

Some components on these automated systems can wear or otherwise become out of tolerance from the originally designed dimensions or positions due to normal operations. Determining such wear or changes is typically done by manually shutting down the automated system to allow an operator to physically inspect the components and then make a determination regarding whether service is required. This process can be time consuming and expensive as production is typically stopped during the inspection process.

The present disclosure addresses these and other issues associated with traditional inspection of automated systems.

SUMMARY

This section provides a general summary of the disclosure and is not a comprehensive disclosure of its full scope or all of its features.

In one form, a method for monitoring health of a machine includes monitoring a set of first electrical signals indicative of control of a motor of the machine while the machine is operated in a first autonomous mode, determining that an abnormal operating condition has occurred in response to the set of first electrical signals meeting a first criteria, having the machine operate in a test mode in response to the determination that the abnormal operating condition has occurred, monitoring a set of second electrical signals indicative of control of the motor during the test mode, and determining a fault condition in response to the set of second electrical signals meeting a second criteria. In a variety of alternative forms of the present disclosure: the set of first electrical signals is indicative of numerical control of the motor or is indicative of a mechanical response of a subsystem; the set of first electrical signals includes at least one of encoder position and following error; the set of first electrical signals includes drive current of the motor; the method further includes (a) generating and outputting a service ticket in response to the set of second electrical signals meeting the second criteria, (b) generating and outputting a parts order ticket in response to the set of second electrical signals meeting the second criteria, (c) placing the machine in an inoperable condition until an operator clears the fault condition, (d) performing prescriptive actions based on historical data corresponding to past operation of the machine, or (e) any combination of (a)-(d); the first autonomous mode is a normal operating mode in which the machine is operating on a workpiece and the test mode is a mode in which the machine is moving through predetermined motions without operating on the workpiece; the method further includes: periodically having the machine operate in an autonomous baseline check mode absent a prior determination that an abnormal operating condition has occurred, monitoring a set of third electrical signals indicative of control of the motor during the autonomous baseline check mode, and determining that a fault condition has occurred in response to the set of third electrical signals exceeding at least one third threshold; the method further includes: recording and storing the set of third electrical signals, and comparing the set of third electrical signals to previously recorded electrical signals indicative of control of the motor during previous operation in the autonomous baseline check mode; the method further includes: inputting electrical signals that are indicative of control of the motor to at least one machine learning algorithm, analyzing the input electrical signals using the at least one machine learning algorithm to predict a timeframe in which service will be required, and outputting at least one of the following based on the predicted timeframe: a service date, a service ticket, a part order, or a combination thereof; the machine is either a first type of machine that includes a base, a handling device, a plurality of wires coupled to a handling device, and a gantry or track based equipment supporting the wires for movement relative to the base, wherein the gantry is configured to furl and unfurl along a track and the drive motor controls movement of the handling device along an axis of the track, or the machine is a second type of machine that is a multi-axis pedestal robot.

In another form, a diagnostic controller for a machine includes one or more microprocessors configured to monitor a set of first electrical signals indicative of control of a motor of the machine while the machine is operated in a first autonomous mode. The one or more microprocessors is configured to determine that an abnormal operating condition has occurred in response to the set of first electrical signals exceeding at least one first threshold. The one or more microprocessors is configured to instruct the machine to operate in a test mode in response to the determination that the abnormal operating condition has occurred. The one or more microprocessors is configured to monitor a set of second electrical signals indicative of control of the motor during the test mode. The one or more microprocessors is configured to determine a fault condition in response to the set of second electrical signals exceeding at least one second threshold. In a variety of alternative forms of the present disclosure: the set of first electrical signals includes one of the following: signals indicative of numerical control of the motor, drive current of the motor, or a combination thereof; the one or more microprocessors is further configured to perform one of the following: (a) generate and output a service ticket in response to the set of second electrical signals exceeding the at least one second threshold, (b) generate and output a parts order ticket in response to the set of second electrical signals exceeding the at least one second threshold, (c) place the machine in an inoperable condition until an operator clears the fault condition, (d) performing prescriptive actions based on historical data corresponding to past operation of the machine, or (e) any combination of (a)-(d); the one or more microprocessors is further configured to: periodically instruct the machine to operate in an autonomous baseline check mode absent a prior determination that an abnormal operating condition has occurred, monitor a set of third electrical signals indicative of control of the motor during the autonomous baseline check mode, and determine that a fault condition has occurred in response to the set of third electrical signals exceeding at least one third threshold; the one or more microprocessors is further configured to: record and store the set of third electrical signals, and compare the set of third electrical signals to previously recorded electrical signals indicative of control of the motor during previous operation in the autonomous baseline check mode; the one or more microprocessors is further configured to: input electrical signals that are indicative of control of the motor to at least one machine learning algorithm, analyze the input electrical signals using the machine learning algorithms to predict a timeframe in which service will be required, and output at least one of the following based on the predicted timeframe: a service date, a service ticket, a part order, or a combination thereof; a machine for handling workpieces includes the diagnostic controller and further includes a base, a handling device, a plurality of wires coupled to a handling device, and a gantry supporting the wires for movement relative to the base, wherein the gantry is configured to furl and unfurl along a track and the drive motor controls movement of the handling device along an axis of the track.

In yet another form, a method of operating an automated machine includes operating the machine in a first autonomous mode in which machine performs operations on a workpiece. The method includes monitoring a set of first electrical signals, the first electrical signals being signals sent or received by a control unit of the machine during the first autonomous mode and being indicative of control of the motor, periodically operating the machine in a baseline check mode in which the machine performs a movement routine without a workpiece, monitoring and recording sets of second electrical signals indicative of control of the motor during the baseline check modes, analyzing trends in the sets of second electrical signals, predicting a fault condition based on the trends, and outputting: (a) a predicted fault date for which the fault condition is predicted to occur, (b) a service date prior to a predicted fault date for which the fault condition is predicted to occur, (c) a type of fault condition predicted to occur, (d) prescriptive actions based on historical data corresponding to past operation of the machine, or (e) any combination of (a)-(d). In a variety of alternative forms of the present disclosure: the first and second electrical signals include at least one of an encoder position, a following error, a torque sensor output, an accelerometer output, and a motor drive current, wherein the machine includes a plurality of wires, a handling device, a base, and a gantry, the wires being coupled to the handling device and the base, the gantry supporting the wires for movement relative to the base, and wherein the gantry is configured to furl and unfurl along a track and the drive motor controls movement of the handling device along an axis of the track; the method further includes: inputting electrical signals that are indicative of control of the motor to at least one machine learning algorithm, analyzing the input electrical signals using the at least one machine learning algorithm to predict a timeframe in which service will be required, and outputting at least one of the following based on the predicted timeframe: a service date, a service ticket, a part order, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
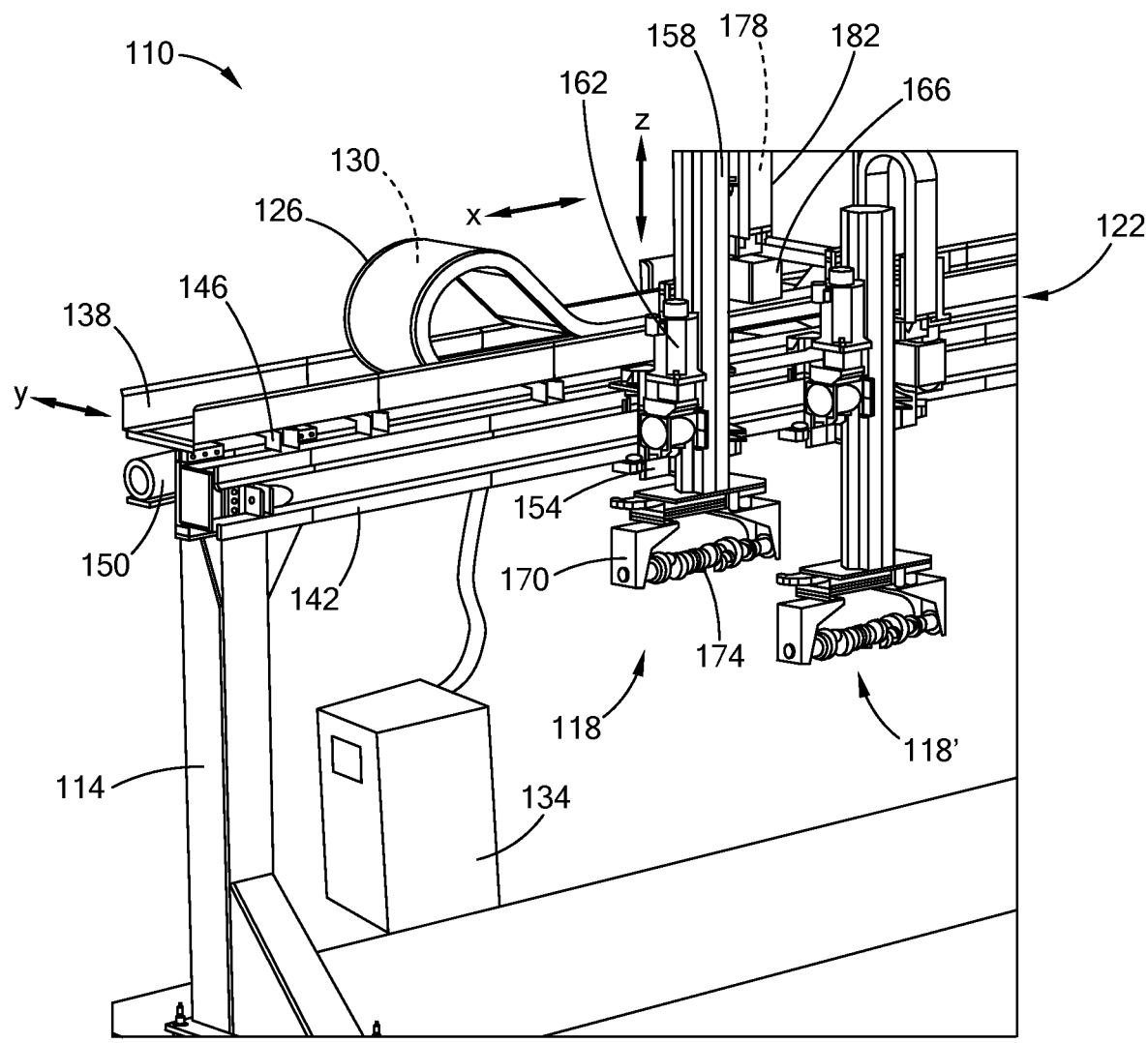
FIG. 1 is a perspective view of an automation system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Figure 2:
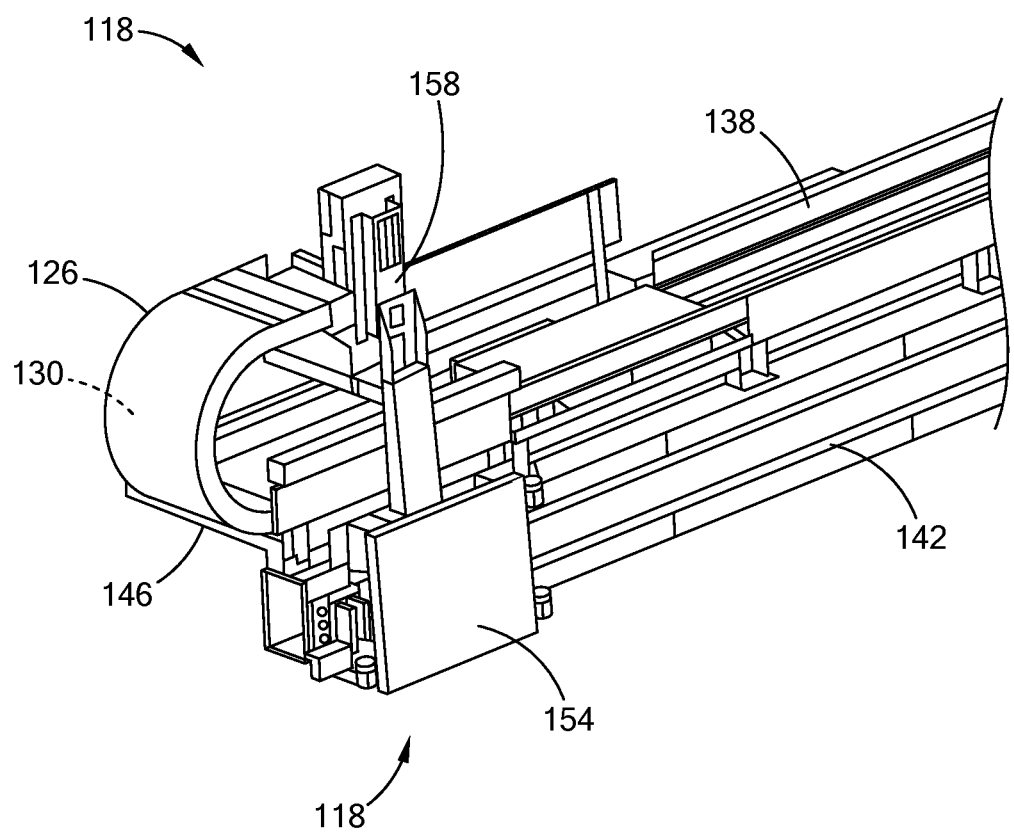
FIG. 2 is a perspective view of a portion of the automation system of FIG. 1, illustrated in a first position.

Referring to FIGS. 1 and 2, an example automated machine or system 110 is illustrated. The automated system 110 includes a base 114, an end effector assembly 118, a gantry 122, a first cable carrier 126 a plurality of first wires 130, and a controller 134. The base 114 is generally stationary. The base 114 supports the gantry 122 above the ground. The gantry 122 includes plurality of tracks disposed along different axes (e.g., the X-axis, Y-axis, and Z-axis). In the example provided, the gantry 122 includes a first track 138 along the X-axis, a second track 142 along the X-axis and a third track 146 along the Y-axis.

Figure 3:
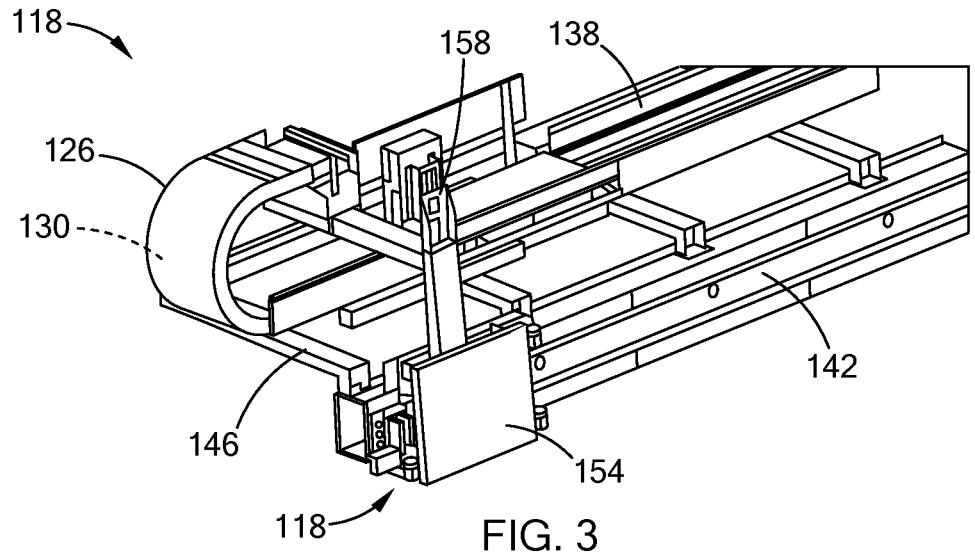
FIG. 3 is a perspective view of a portion of the automation system of FIG. 1, illustrated in a second position.

In the example provided, the base 114 is attached to the floor to support the tracks 138, 142, 146, 158. In an alternative configuration, not specifically shown, the base 114 can suspend the tracks 138, 142, 146, 158 from the ceiling, a wall, or another structure. Referring to FIG. 3, the second track 142 is supported by the third track 146 such that the second track 142 can translate relative to the first track 138 along the Y-axis. FIG. 3 shows the second track 142 in a position that is extended away from the first track 138, whereas FIGS. 1 and 2 show the second track 142 in a position that is retracted proximal to the first track 138. The third track 146 is configured to permit the second track 142 to be positioned at intermediate positions between the positions shown in FIGS. 1-3. The base 114 can also include a first drive motor 150 that is configured to translate the second track 142 along the third track 146 (i.e., along the Y-axis).

The end effector assembly 118 includes a platform 154, a fourth track 158, a second drive motor 162, a third drive motor 166, and a handling device 170. The platform 154 is mounted to the second track 142 for translation along the second track 142 (i.e., along the X-axis) and for movement with the second track 142 (i.e., along the Y-axis), though other configurations can be used. The fourth track 158 extends along the Z-axis. The fourth track 158 is mounted to the platform 154 for movement therewith, though other configurations can be used. The handling device 170 is supported by the fourth track 158 for translation along the fourth track (i.e., along the Z-axis) and movement with the fourth track 158 (i.e., along the X and Y-axes). The handling device 170 can also optionally be configured to rotate about the Z-axis. The second drive motor 162 is mounted to the platform 154 and configured to move the platform 154 along the second track 142, though other configurations can be used. The third drive motor 166 can be mounted to the fourth track 158 or the handling device 170 and is configured to move the handling device 170 along the fourth track 158, though other configurations can be used. In the example provided, the handling device 170 is configured to grip and move a workpiece. In an alternative construction, not specifically shown, the handling device 170 can include a tool and be configured to use the tool to perform operations on a workpiece 174, such as machining, bending, or welding for example. As shown in FIG. 1, a second end effector assembly 118' can be mounted to the second track 142 and can be similar to the end effector assembly 118.

In the example provided, the third drive motor 166 is electrically coupled to the controller 134 via a plurality of second wires 178 that are supported by a second cable carrier 182. The second cable carrier 182 furls and unfurls along the Z-axis. In one configuration, the second cable carrier 182 can include a plurality of links (not specifically shown) that are connected to permit controlled movement of the second wires 178 and can be constructed generally similar to the first cable carrier 126 as described below with reference to FIGS. 4 and 5.

The first wires 130 have a first end attached for movement along the X-axis with the platform 154 and a second end attached to the base 114 or gantry 122. The first wires 130 provide electrical communication between the controller 134 and the second and third drive motors 162, 166, the handling device 170, and any sensors (not specifically shown) that move with the platform 154, such as sensors configured to determine the position of the handling device 170, configured to determine the rotational positions of the drive motors 150, 162, 166, or configured to determine the position or movement of other components or workpieces for example. Some non-limiting types of sensors can include pull/push force sensors, velocity transducers, Hall-effect sensors, current sensors, voltage sensors, among others. Such sensors (not shown) can be mounted to the components of the automated system 110 (e.g., mounted to the rails, motors, gearboxes, a track, CAT-tracks) or can be separately supported.

The first wires 130 are supported by the first cable carrier 126. The first cable carrier 126 is configured to furl and unfurl along the first track 138 (i.e., along the X-axis). FIGS. 1 and 2 illustrate the end effector assembly 118 in different positions along the X-axis though the end effector assembly 118 can be positioned therebetween (e.g., at intermediate positions). With additional reference to FIGS. 4 and 5, the first cable carrier 126 can be a chain that includes a plurality of links 410 that are connected together to pivot along axes that are to perpendicular to the direction along which the first cable carrier 126 furls and unfurls (i.e., the X-axis). The links 410 can be configured to limit a minimum bend radius of the first cable carrier 126 to prevent kinking of the first wires 130. The first cable carrier 126 can include wire supports 414 that extend across the links 410 to support the first wires 130 within the first cable carrier 126 and prevent tangling of the first wires 130.

Figure 4:
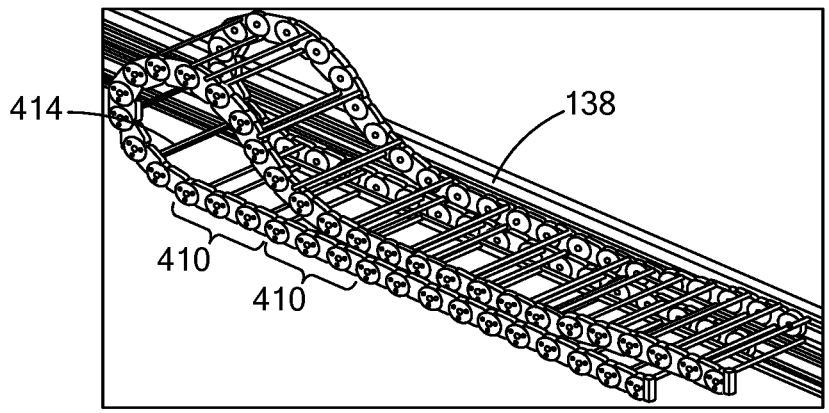
FIG. 4 is a perspective view of a cable carrier of the automation system of FIG. 1.
Figure 5:
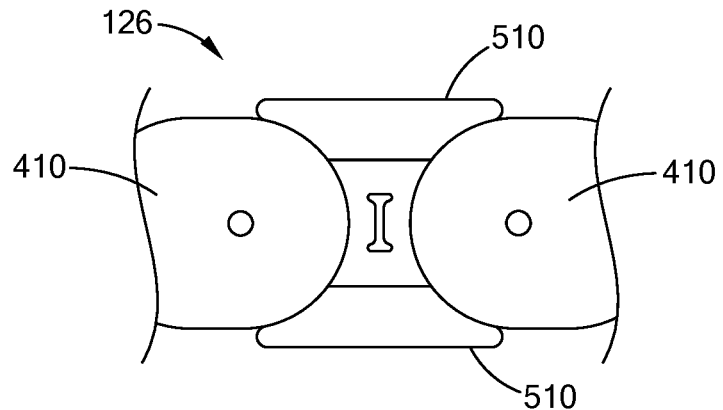
FIG. 5 is a side view of a portion of the cable carrier of FIG. 4.

As shown in FIG. 5, the first cable carrier 126 can include glide shoes 510 between the links 410. The glide shoes 510 are configured to contact and slide along the first track 138 and/or along other glide shoes of the first cable carrier 126 as shown in FIG. 4 when furling and unfurling the first cable carrier 126.

Returning to FIG. 1, the controller 134 is generally configured to control operation of the drive motors 150, 162, 166 and is in electrical communication with the drive motors 150, 162, 166 to send and receive signals therewith such as via the wires 130 and 178. The controller 134 can also be connected to sensors (not specifically shown) that can be used to determine the position, movement, or operating state of components of the automated system 110.

Figure 6:
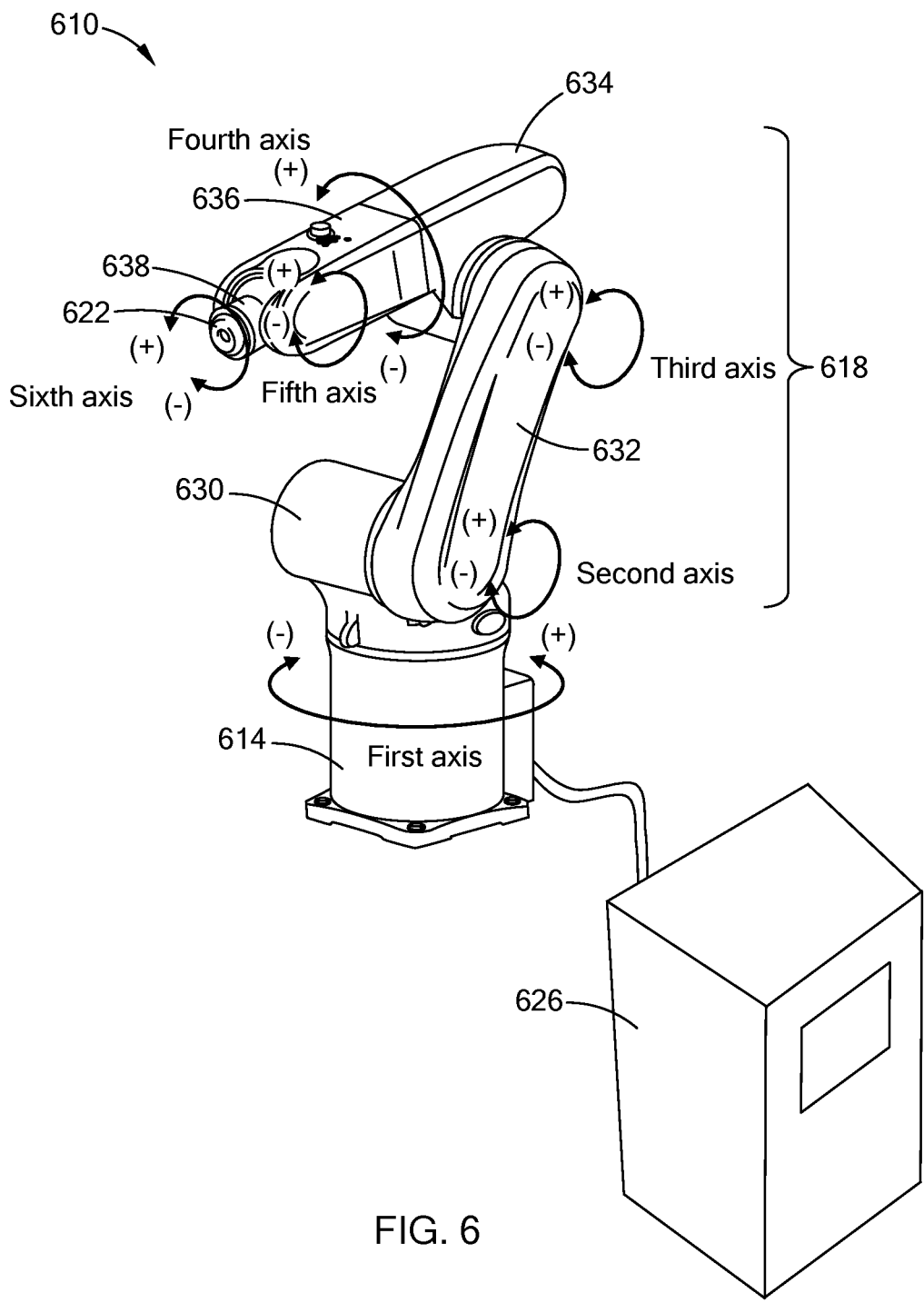
FIG. 6 is a perspective view of an automation system of a second construction in accordance with the teachings of the present disclosure.

Referring to FIG. 6, an automated system 610 of a second construction is illustrated. The automated system 610 includes a base 614, a multi-axis robotic arm 618, an end effector 622, and a controller 626. In the example provided, the base 614 is fixed to the ground. In alternative constructions, not specifically shown, the base 614 can be mounted in a different configuration such as to a gantry, a movable platform, the ceiling, or a wall for example.

In the example provided, the multi-axis robotic arm 618 includes a plurality of sections 630, 632, 634, 636, 638, though other numbers of sections can be used. Drive motors (not specifically shown) can be disposed within the base 614 and sections 630, 632, 634, 636, 638 to rotate the sections 630, 632, 634, 636, 638 about various axes as shown. In the example provided, the robotic arm 618 can rotate about 5 different axes while the end effector 622 rotates about a sixth axis as shown. Various bearings (not shown) can be disposed within the robotic arm 618 to support the sections 630, 632, 634, 636, 638 and end effector 622 for rotation about the axes. The end effector 622 is configured to grip a workpiece (not shown) to move the workpiece. Alternatively, the end effector 622 can be configured to grip or operate a tool (not shown) for operating on the workpiece (not shown).

The controller 626 can be similar to the controller 134 (FIG. 1) except as otherwise shown or described herein. The controller 626 is in electrical communication with the motors that operate the robotic arm 618 and end effector 622 and can be in communication with any sensors (not specifically shown) that move with the robotic arm 618 and/or the end effector 622, such as sensors configured to determine the positions or movement of the end effector 622 or sections 630, 632, 634, 636, 638 or configured to determine the rotational positions of the drive motors (not shown) for example. The controller 626 may also be in communication with other sensors (not shown) such as those mounted separately from the robotic arm 618. The controller 626 is configured to operate the motors (not shown) to move the sections 630, 632, 634, 636, 638 and to move and operate the end effector 622.

Figure 7:
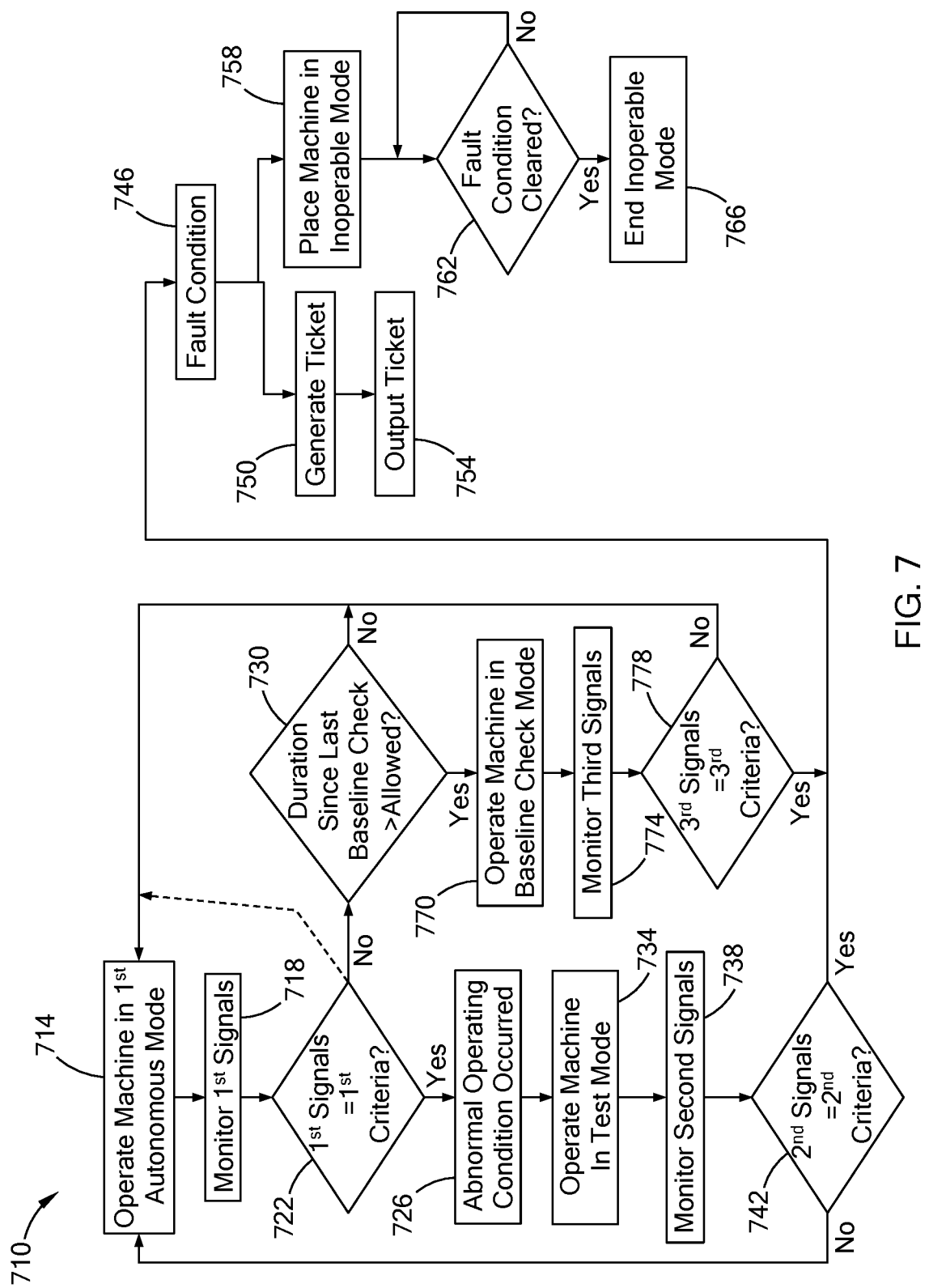
FIG. 7 is a flowchart of a method for operating an automation system in accordance with the teachings of the present disclosure, illustrated in flow chart form.

With reference to FIG. 7, the autonomous system 110 can be operated according to a method 710. While described herein with reference to the autonomous system 110, the method 710 can be used with the autonomous system 610 (FIG. 6) or other autonomous systems (not specifically shown).

With reference to the method 710, the autonomous system 110 is operated in a first autonomous mode at step 714. During this first autonomous mode, the controller 134 can autonomously control the motors 150, 162, 166 to move and operate the handling device 170 to move and/or perform operations on workpieces 174 as described above.

While the autonomous system 110 is being operated in the first autonomous mode, the controller 134 monitors a set of first electric signals as shown in step 718. The set of first electric signals can be one or more signal. The first electric signals are indicative of operation of the autonomous system 110 in the first autonomous mode, such as motor control or feedback signals. For example, the first electric signals can be drive current, encoder position, and/or follower position, among others. In one configuration, these first electric signals can be the numerical control values. In another configuration, the first signals can include signals received from sensors (not shown) or a combination of numerical control values and sensed values.

At step 722, the controller 134 compares the set of first electric signals to a first set of criteria. The monitoring and comparing of steps 718 and 722 can be done in real-time during operation of the autonomous system 110 in the first autonomous mode or the first electric signals can be recorded and stored and compared at a later time. If the first electric signals meet the first criteria, then the method 710 proceeds to step 726.

In one configuration, shown with a dashed line, if the first electric signals do not meet the first criteria, then the method 710 returns to step 714 to continue operating as normal. Optionally, in a different configuration, the method 710 can proceed to step 730, via the solid line.

The first criteria can be known or expected values for the first electric signals for a condition in which the autonomous system 110 needs corrective action (e.g., service or replacement of a part). For example, the first criteria can be drive current, encoder position, and/or follower position for the drive motors 150, 161, 166, that is outside of a normal range for proper operation. The first criteria may also include expected values from the sensors (not shown).

At step 726, the controller 134 determines that an abnormal operating condition has occurred. However, at this point, it may be unknown whether the abnormal operating condition was due to an anomaly. Thus, the method 710 proceeds to step 734.

At step 734, the controller 134 operates the autonomous system 110 in a test mode while monitoring a set of second signals via step 738. The set of second electric signals can be one or more signal and may be similar in type to or different in type from the first electric signals. The second electric signals are indicative of operation of the autonomous system 110 in the test mode, such as motor control or feedback signals. For example, the second electric signals can be drive current, encoder position, and/or follower position, among others. In one configuration, these second electric signals can be the numerical control values. In another configuration, the second electric signals can include signals received from the sensors (not shown) or a combination of numerical control values and sensed values.

The test mode can be a mode in which the autonomous system 110 performs movements without performing permanent operations on the workpiece 174. For example, the controller 134 controls the end effector assembly 118 to repeat the previous movements that had caused the first signals to meet the first criteria. These movements may be performed with or without the workpiece 174, provided the movement is not one that would permanently alter the workpiece 174. In another example, the controller 134 controls the end effector assembly 118 to have the assembly 118 move through its full range of motion or through a subset of its range of motion.

At step 742, the controller 134 compares the second electric signals to a set of second criteria. The monitoring and comparing of steps 738 and 742 can be done in real-time during operation of the autonomous system 110 in the test mode or the second electric signals can be recorded and stored and compared at a later time. If the second electric signals meet the second criteria, then the method 710 proceeds to step 746.

If the second electric signals do not meet the second criteria, then the method returns to step 714. In other words, the condition that caused the first signals to meet the first criteria at step 722 may have been an anomaly and the autonomous system 110 can return to operation as normal.

The second criteria can be known or expected values for the second electric signals for a condition in which the autonomous system 110 needs corrective action (e.g., service or replacement of a part). For example, the second criteria can be drive current, encoder position, and/or follower position for the drive motors 150, 161, 166, that is outside of a normal range for proper operation during test mode. The second criteria may also include expected values from the sensors (not shown). The second criteria can be similar to or different from the first criteria.

At step 746, the controller 134 determines that a fault condition has occurred. The controller 134 may then optionally respond or output in one or more ways. For example, the controller 134 may optionally proceed to steps 750 and 754, where the controller 134 generates and outputs one or more tickets such as a service maintenance ticket and/or a parts order ticket. Such a ticket can be an electronic file stored in the controller 134 and/or transmitted electronically to another computer system (not shown) in another location to be stored or can be physically printed at one or more locations for example. Optionally, the controller 134 may place the autonomous system 110 in an inoperable mode via step 758. This inoperable mode can be maintained (via step 762) until it is cleared by an operator, thus placing the autonomous system 110 back in an operable state via step 766. In one configuration, the operator can clear the fault condition by manually inputting a command to clear the fault condition.

Returning to optional step 730, the controller 134 can check to see when the last time a baseline check of the autonomous system 110 was performed. If the duration since a last baseline check is within an allowable duration, then the method 710 can proceed back to step 714 to continue operation as normal. If the duration since the last baseline check is greater than the allowable duration, then the method 710 can proceed to step 770.

At step 770, the controller 134 operates the autonomous system 110 in a baseline check mode while monitoring a set of third electric signals via step 774. The set of third electric signals can be one or more signal and may be a similar type to or different type from the first and/or second signals. The third electric signals are indicative of operation of the autonomous system 110 in the baseline check mode, such as motor control or feedback signals. For example, the third electric signals can be drive current, encoder position, and/or follower position, among others. In one configuration, these third electric signals can be the numerical control values. In another configuration, the third electric signals can include signals received from the sensors (not shown) or a combination of numerical control values and sensed values.

The baseline check mode can be a mode in which the autonomous system 110 performs known movements without the workpiece 174. For example, the end effector assembly 118 may move through its full range of motion or through a subset of its range of motion.

At step 778, the controller 134 compares the third electric signals to a set of third criteria. The monitoring and comparing of steps 774 and 778 can be done in real-time during operation of the autonomous system 110 in the baseline check mode or the third electric signals can be recorded and stored and compared at a later time. If the third electric signals meet the third criteria, then the method 710 proceeds to step 746. If the third electric signals do not meet the third criteria, then the method can return to step 714 and the autonomous system 110 can continue to operate as normal.

The third criteria can be known or expected values for the third electric signals for a condition in which the autonomous system 110 needs corrective action (e.g., service or replacement of a part). For example, the third criteria can be drive current, encoder position, and/or follower position for the drive motors 150, 161, 166, that is outside of a normal range for proper operation during baseline check mode. The third criteria may also include expected values from the sensors (not shown). The third criteria can be similar to or different from the first and/or second criteria.

Figure 8:
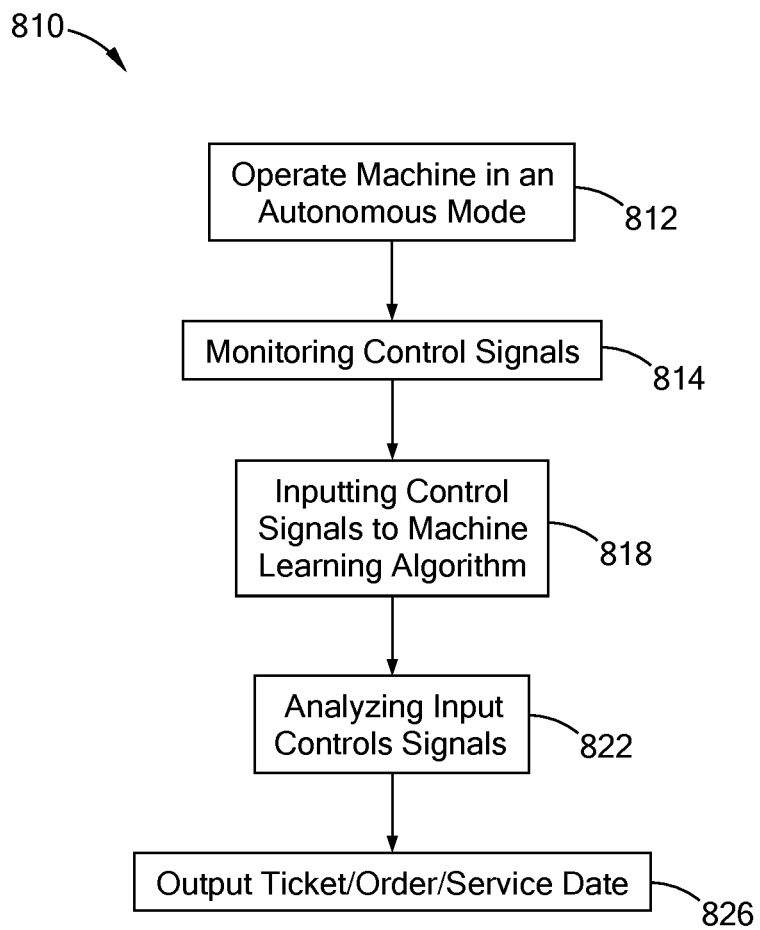
FIG. 8 is a flowchart of another method for operating an automation system in accordance with the teachings of the present disclosure, illustrated in flow chart form.

Referring to FIG. 8, the autonomous system 110 can be operated according to a method 810. While described herein with reference to the autonomous system 110, the method 810 can be used with the autonomous system 610 (FIG. 6) or other autonomous systems (not specifically shown).

With reference to the method 810, the autonomous system 110 is operated in an autonomous mode at step 812. During this autonomous mode, the controller 134 can autonomously control the motors 150, 161, 166 to move and operate the handling device 170 to move and/or perform operations on workpieces 174 as described above.

While the autonomous system 110 is being operated in the autonomous mode, the controller 134 monitors control signals at step 814. The control signals are signals used to control the operation of the motors 150, 161, 166, such as drive current, encoder position, and/or follower position for example.

At step 818, the controller 134 inputs the control signals or values indicative of the control signals into a machine learning algorithm. The type of machine learning algorithm can be any suitable type such as change point detection with a pruning strategy and multinomial logistical regression for prediction, and Euclidean distance for prognostics, for example. The machine learning algorithm can be local on the controller 134 or can be on a remote system (not shown) in communication with the controller 134.

At step 822, the machine learning algorithm analyzes the received control signals or values indicative of the control signals. This analysis can include predicting when specific service will be needed.

At step 826, the machine learning algorithm and/or controller 134 can then output an expected service date and/or generate and output one or more tickets such as a service maintenance ticket and/or a parts order ticket.

Returning to FIG. 7, in an alternative configuration, not specifically shown, the first signals monitored in step 718, the second signals monitored in step 738, and/or the third signals monitored in step 778 can be input into a machine learning algorithm similar to step 818 (FIG. 8), where they can be analyzed similar to step 822 and output an expected service date and/or generate and output one or more tickets similar to step 826.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In this application, the term "controller" may be replaced with the term "circuit". The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples the interface circuits may include wired or wireless interfaces that are connected to a local area network (LAN), the Internet, a wide area network (WAN), or combinations thereof. The functionality of the controller of the present disclosure may be distributed among multiple controllers that are connected via interface circuits.

In another form, the apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for monitoring health of a machine, the method comprising:
    monitoring a set of first electrical signals indicative of control of a motor of the machine while the machine is operating in a first autonomous mode, wherein during the first autonomous mode, the machine is configured to perform one or more movements that operate on a workpiece;
    determining that an abnormal operating condition has occurred in response to the set of first electrical signals meeting a first criteria;
    operating the machine in a test mode in response to the determination that the abnormal operating condition has occurred, wherein during the test mode, the machine is configured to perform one or more test movements without permanently altering the workpiece;
    monitoring a set of second electrical signals indicative of control of the motor while the machine is operating in the test mode;
    determining a fault condition has occurred in response to the set of second electrical signals meeting a second criteria;
    determining an anomalous condition has occurred in response to the set of second electrical signals not meeting the second criteria; and
    operating the machine in the first autonomous mode in response to determining the anomalous condition has occurred.

2. The method according to claim 1, wherein the set of first electrical signals is indicative of numerical control of the motor or is indicative of a mechanical response of a subsystem.

3. The method according to claim 2, wherein the set of first electrical signals includes at least one of encoder position and following error.

4. The method according to claim 1, wherein the set of first electrical signals includes drive current of the motor.

5. The method according to claim 1 further comprising one of the following:
    (a) generating and outputting a service ticket in response to the set of second electrical signals meeting the second criteria;
    (b) generating and outputting a parts order ticket in response to the set of second electrical signals meeting the second criteria;
    (c) placing the machine in an inoperable condition until an operator clears the fault condition;
    (d) performing prescriptive actions based on historical data corresponding to past operation of the machine; or
    (e) any combination of (a)-(d).

6. The method according to claim 1, wherein the one or more test movements includes the one or more movements that operate on the workpiece during the first autonomous mode.

7. The method according to claim 1 further comprising:
    periodically having the machine operate in an autonomous baseline check mode absent a prior determination that an abnormal operating condition has occurred;
    monitoring a set of third electrical signals indicative of control of the motor during the autonomous baseline check mode; and
    determining that a fault condition has occurred in response to the set of third electrical signals exceeding at least one third threshold.

8. The method according to claim 7 further comprising:
    recording and storing the set of third electrical signals; and
    comparing the set of third electrical signals to previously recorded electrical signals indicative of control of the motor during previous operation in the autonomous baseline check mode.

9. The method according to claim 8 further comprising:
    inputting electrical signals that are indicative of control of the motor to at least one machine learning algorithm;
    analyzing the input electrical signals using the at least one machine learning algorithm to predict a timeframe in which service will be required; and
    outputting at least one of the following based on the predicted timeframe: a service date, a service ticket, a part order, or a combination thereof.

10. The method according to claim 1, wherein the machine is either:
    a first type of machine that includes a base, a handling device, a plurality of wires coupled to a handling device, and a gantry or track based equipment supporting the wires for movement relative to the base, wherein the gantry is configured to furl and unfurl along a track and the drive motor controls movement of the handling device along an axis of the track; or
    a second type of machine that is a multi-axis robot.

11. A diagnostic controller for a machine comprising:
    one or more microprocessors configured to:
        monitor a set of first electrical signals indicative of control of a motor of the machine while the machine is operating in a first autonomous mode, wherein the first autonomous mode operates the machine to perform one or more movements that operate on a workpiece;
        determine that an abnormal operating condition has occurred in response to the set of first electrical signals exceeding at least one first threshold;
        operate the machine in a test mode in response to the determination that the abnormal operating condition has occurred, wherein the test mode operates the machine to perform one or more test movements without permanently altering the workpiece;
        monitor a set of second electrical signals indicative of control of the motor while the machine is operating in the test mode;
        determine a fault condition has occurred in response to the set of second electrical signals exceeding at least one second threshold;

determine an anomalous condition has occurred in response to the set of second electrical signals not meeting the second criteria; and operate the machine in the first autonomous mode in response to determining the anomalous condition has occurred.

12. The diagnostic controller according to claim 11, wherein the set of first electrical signals includes one of the following: signals indicative of numerical control of the motor, drive current of the motor, or a combination thereof.

13. The diagnostic controller according to claim 11, wherein the one or more microprocessors is further configured to perform one of the following:
   (a) generate and output a service ticket in response to the set of second electrical signals exceeding the at least one second threshold;
   (b) generate and output a parts order ticket in response to the set of second electrical signals exceeding the at least one second threshold;
   (c) place the machine in an inoperable condition until an operator clears the fault condition;
   (d) performing prescriptive actions based on historical data corresponding to past operation of the machine; or
   (e) any combination of (a)-(d).

14. The diagnostic controller according to claim 11, wherein the one or more microprocessors is further configured to:
   periodically instruct the machine to operate in an autonomous baseline check mode absent a prior determination that an abnormal operating condition has occurred;
   monitor a set of third electrical signals indicative of control of the motor during the autonomous baseline check mode; and
   determine that a fault condition has occurred in response to the set of third electrical signals exceeding at least one third threshold.

15. The diagnostic controller according to claim 14, wherein the one or more microprocessors is further configured to:
   record and store the set of third electrical signals; and
   compare the set of third electrical signals to previously recorded electrical signals indicative of control of the motor during previous operation in the autonomous baseline check mode.

16. The diagnostic controller according to claim 15, wherein the one or more microprocessors is further configured to:
   input electrical signals that are indicative of control of the motor to at least one machine learning algorithm;
   analyze the input electrical signals using the machine learning algorithms to predict a timeframe in which service will be required; and
   output at least one of the following based on the predicted timeframe: a service date, a service ticket, a part order, or a combination thereof.

17. A machine for handling workpieces comprising the diagnostic controller according to claim 11 and further comprising a base, a handling device, a plurality of wires coupled to a handling device, and a gantry supporting the wires for movement relative to the base, wherein the gantry is configured to furl and unfurl along a track and the drive motor controls movement of the handling device along an axis of the track.

18. A method of operating an automated machine, the method comprising:
   operating the machine in a first autonomous mode in which machine performs operations on a workpiece;
   monitoring a set of first electrical signals, the first electrical signals being signals sent or received by a control unit of the machine while the machine is operating in the first autonomous mode and being indicative of control of the motor, wherein during the first autonomous mode, the machine is configured to perform one or more movements that operate on a workpiece;
   periodically operating the machine in a baseline check mode in which the machine performs a movement routine without a workpiece;
   monitoring and recording sets of second electrical signals indicative of control of the motor while the machine is operating in the baseline check mode;
   determining a present fault condition has occurred in response to the set of second electrical signals meeting a second criteria;
   determining an anomalous condition has occurred in response to the set of second electrical signals not meeting the second criteria;
   analyzing trends in the sets of second electrical signals;
   predicting a future fault condition based on the trends; and
   outputting:
      (a) a predicted fault date for which the future fault condition is predicted to occur;
      (b) a service date prior to a predicted fault date for which the future fault condition is predicted to occur;
      (c) a type of future fault condition predicted to occur;
      (d) prescriptive actions based on historical data corresponding to past operation of the machine; or
      (e) any combination of (a)-(d).

19. The method according to claim 18, wherein the first and second electrical signals include at least one of an encoder position, a following error, a torque sensor output, an accelerometer output, and a motor drive current, wherein the machine includes a plurality of wires, a handling device, a base, and a gantry, the wires being coupled to the handling device and the base, the gantry supporting the wires for movement relative to the base, and wherein the gantry is configured to furl and unfurl along a track and the drive motor controls movement of the handling device along an axis of the track.

20. The method according to claim 18 further comprising:
   inputting electrical signals that are indicative of control of the motor to at least one machine learning algorithm;
   analyzing the input electrical signals using the at least one machine learning algorithm to predict a timeframe in which service will be required; and
   outputting at least one of the following based on the predicted timeframe: a service date, a service ticket, a part order, or a combination thereof.

* * * * *